(12) United States Patent
Smith

(10) Patent No.: US 6,958,687 B1
(45) Date of Patent: Oct. 25, 2005

(54) MOTOR VEHICLE U-TURN SIGNAL

(76) Inventor: Denise Ann Smith, 2155 NW. 27th Ter., Fort Lauderdale, FL (US) 33311

( * ) Notice: Subject to any disclaimer, the term of this patent is extended or adjusted under 35 U.S.C. 154(b) by 0 days.

(21) Appl. No.: 10/667,185

(22) Filed: Sep. 17, 2003

(51) Int. Cl.⁷ .............................................. B60Q 1/52
(52) U.S. Cl. ..................... 340/468; 340/472
(58) Field of Search ............................... 340/468, 475, 340/472, 471

(56) References Cited

U.S. PATENT DOCUMENTS

| | | | | |
|---|---|---|---|---|
| 5,003,289 A | * | 3/1991 | Roman | 340/475 |
| 5,281,950 A | * | 1/1994 | Le | 340/475 |
| 5,663,708 A | * | 9/1997 | Strawn | 340/465 |
| 5,680,100 A | * | 10/1997 | Millsap | 340/463 |
| 5,731,755 A | * | 3/1998 | Boxer | 340/465 |
| 6,195,001 B1 | * | 2/2001 | Haddad et al. | 340/475 |

* cited by examiner

Primary Examiner—Jeffery Hofsass
Assistant Examiner—Jennifer Stone
(74) Attorney, Agent, or Firm—Michael I. Kroll

(57) ABSTRACT

The present invention 10 discloses a signal light 28 for motor vehicles 12 having a U-turn symbol 22 incorporated on the signal light to inform other motorists 14, 16 of the vehicle's 12 intent. The signal 28 is used when making a U-turn and is located on the driver's side 18 front 30 and rear 32 of the vehicle 12. The device 10 is activated by the vehicle's operator by means of a switch 24 that is located on the dashboard 26 of the vehicle 12. Other vehicles, both oncoming 14 and vehicles 16 in the rear of the U-turn vehicle 12, can clearly see the intent of the driver, avoiding what could be a potential accident. The U-turn light 28 is located on the vehicle 12 in conjunction with turn signal lights and headlights 20. The signal light 28 comprises an ambient light source visible during day light and night hours.

4 Claims, 10 Drawing Sheets

MOTOR VEHICLE U-TURN SIGNAL

BACKGROUND OF THE INVENTION

Field of the Invention

The present invention relates generally to motor vehicle signaling devices and, more specifically to a signal light for vehicles having a U-turn symbol incorporated on a signal light to inform other motorists of the vehicle's intent. The signal is used when making a U-turn and is located on the driver's side front and rear of the vehicle and/or rear windshield of the vehicle. The device is activated by the vehicle's operator by means of a switch that is located on the dashboard of said vehicle. Other vehicles, oncoming and vehicles in the rear of the U-turn vehicle, can clearly see the intent of the driver, avoiding what could be a potential accident. The U-turn light is located on the vehicle in conjunction with turn signal lights and headlights. The signal light comprises an ambient light source visible during day light and night hours.

SUMMARY OF THE PRESENT INVENTION

The present invention discloses a signal light for motor vehicles having a U-turn symbol incorporated on the signal light to inform other motorists of the vehicle's intent. The signal is used when making a U-turn and is located on the driver's side front and rear of the vehicle and/or rear windshield of the vehicle. The device is activated by the vehicle's operator by means of a switch that is located on the dashboard of the vehicle. Other vehicles, both oncoming and vehicles in the rear of the U-turn vehicle, can clearly see the intent of the driver, avoiding what could be a potential accident. The U-turn light is located on the vehicle in conjunction with turn signal lights and headlights. The signal light comprises an ambient light source visible during day light and night hours.

A primary object of the present invention is to provide a signal light for vehicles having a U-turn symbol incorporated on a signal light.

Another object of the present invention is to provide an additional signal light on a vehicle.

Yet another object of the present invention is to provide a signal light with a remote switch for activation.

Still yet another object of the present invention is to provide a signal light unlike ones available at the present moment.

Another object of the present invention is to provide a safer means of travel by vehicle.

Yet another object of the present invention is to provide a signal light that will help prevent motor vehicle accidents.

Still yet another object of the present invention is to provide a signal light to warn motorists of the intent of the vehicles drive to make a U-turn.

Additional objects of the present invention will appear as the description proceeds.

The present invention overcomes the shortcomings of the prior art by providing a signal light for vehicles having a U-turn symbol incorporated on a signal light to inform other motorists of the vehicle's intent. The signal is used when making a U-turn and is located on the driver's side front and rear of the vehicle and/or rear windshield of the vehicle. The device is activated by the vehicle's operator by means of a switch that is located on the dashboard of said vehicle.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which.

LIST OF REFERENCE NUMERALS

Figure 1:
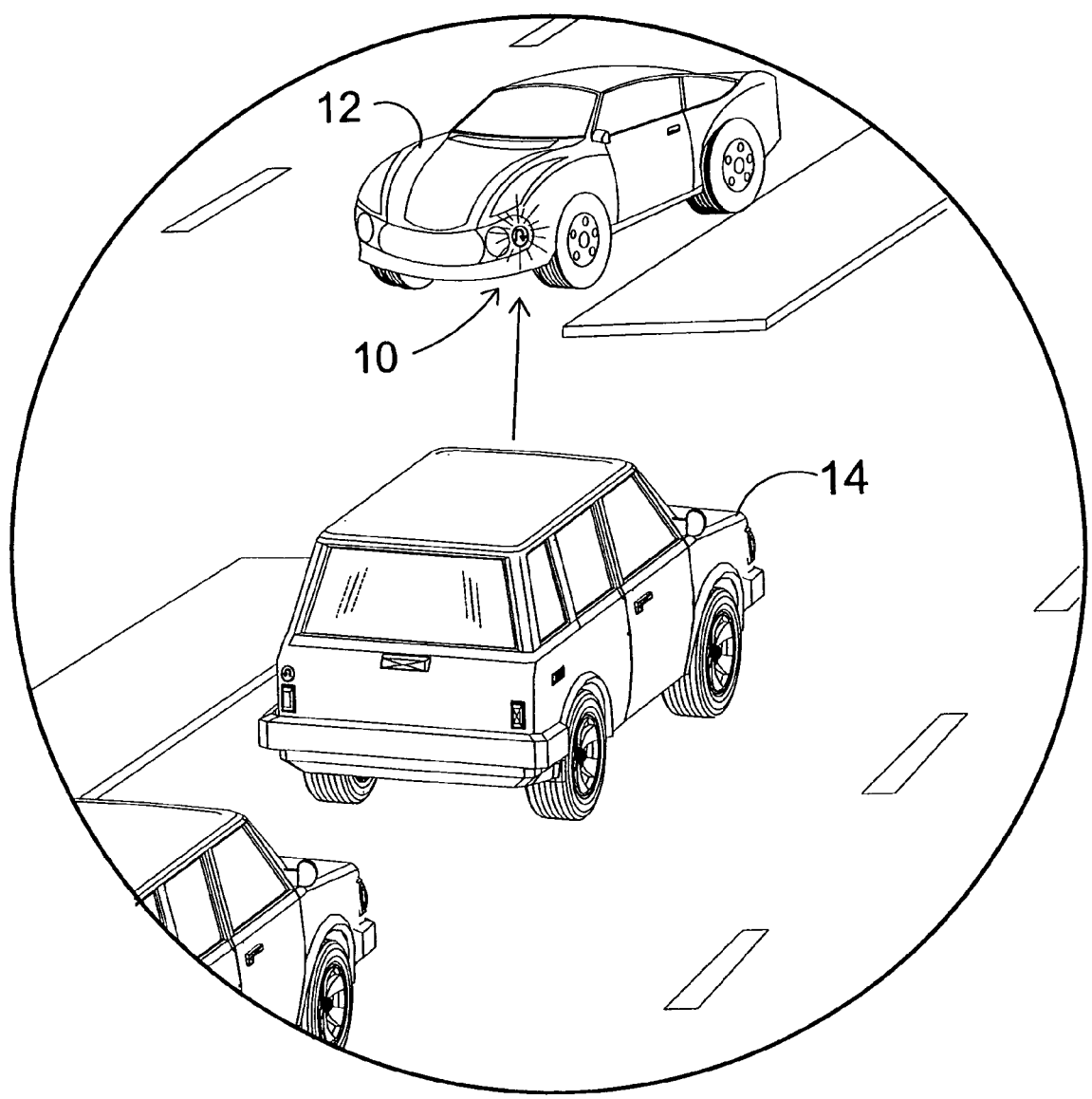
FIG. 1 is an illustrative view of the present invention in use.

With regard to reference numerals used, the following numbering is used throughout the drawings.

10 present invention
12 vehicle
14 oncoming vehicle
16 rear vehicle
18 left side
20 head light/signal light
22 U-turn indicia
24 switch
26 dashboard
28 signal light
30 vehicle front
32 vehicle rear
34 battery
36 junction box
38 wiring
40 lens
42 rear windshield

DETAILED DESCRIPTION OF THE PREFERRED EMBODIMENTS

The following discussion describes in detail one embodiment of the invention. This discussion should not be construed, however, as limiting the invention to those particular embodiments since practitioners skilled in the art will recognize numerous other embodiments as well. For a definition of the complete scope of the invention, the reader is directed to the appended claims.

Turning to FIG. 1, shown therein is an illustrative view of the present invention 10 in use. The present invention 10 discloses a signal light for motor vehicles 12 having a U-turn symbol incorporated on a signal light to inform other motorists 14 of the vehicle's 12 intent. The signal 10 is used when making a U-turn and is located on the front and rear of the left side of the vehicle 12. The device 10 is activated by the vehicle's 12 operator by means of the activation of a switch that is located on the dashboard of the vehicle.

Figure 2:
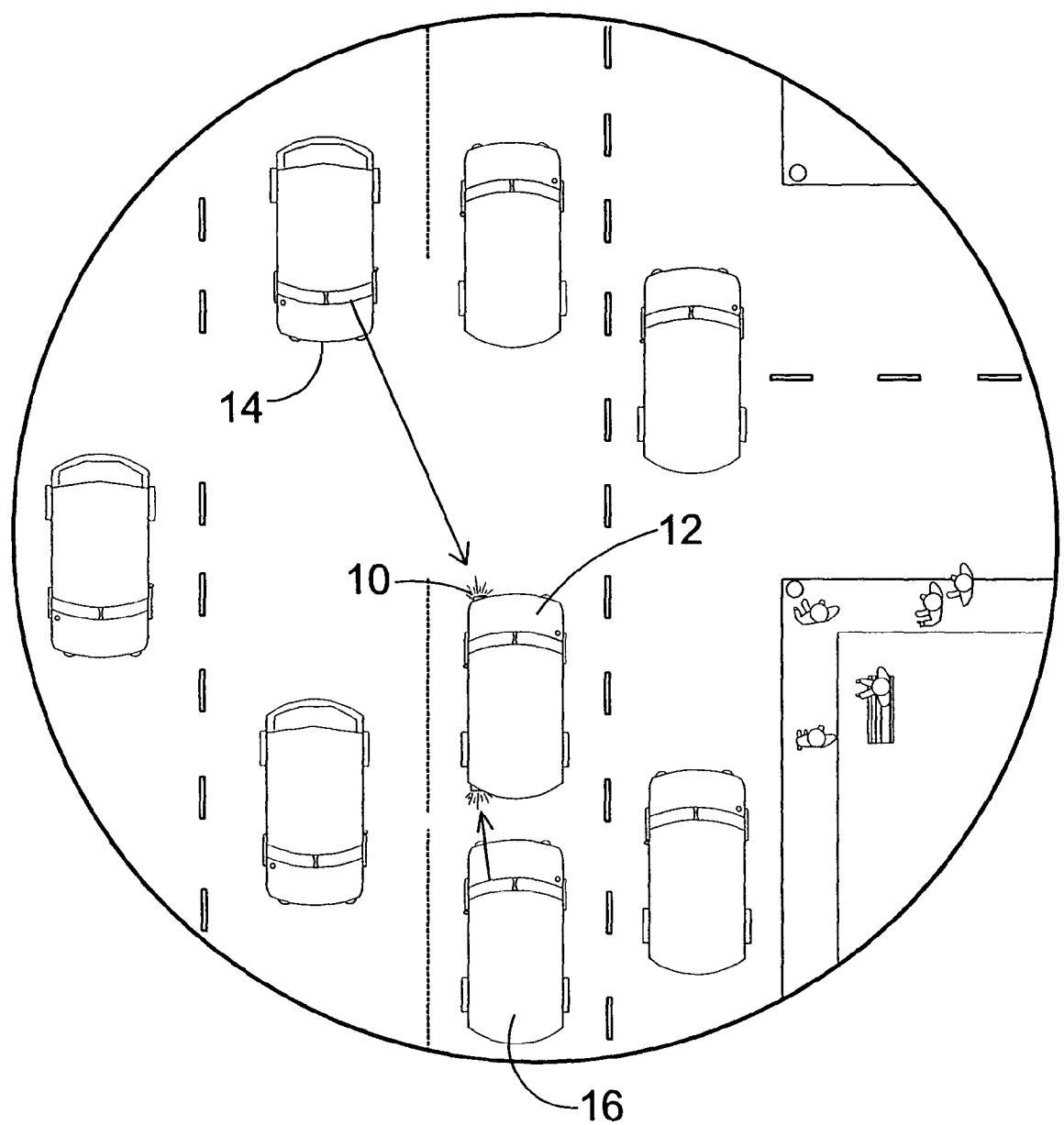
FIG. 2 is a topographical view of the present invention in use.

Turning to FIG. 2, shown therein is a topographical view of the present invention 10 in use. Shown is the present invention 10 being a signal light for vehicles 12 having a U-turn symbol incorporated on a signal light to inform other motorists 14 of the vehicle's 12 intent. The illustration depicts a vehicle 12 having the U-turn light of the present invention 10 activated. Other vehicles, oncoming 14 and vehicles 16 in the rear of the U-turn vehicle 12 can clearly see the intent of the driver, avoiding what could be a potential accident.

Figure 3:
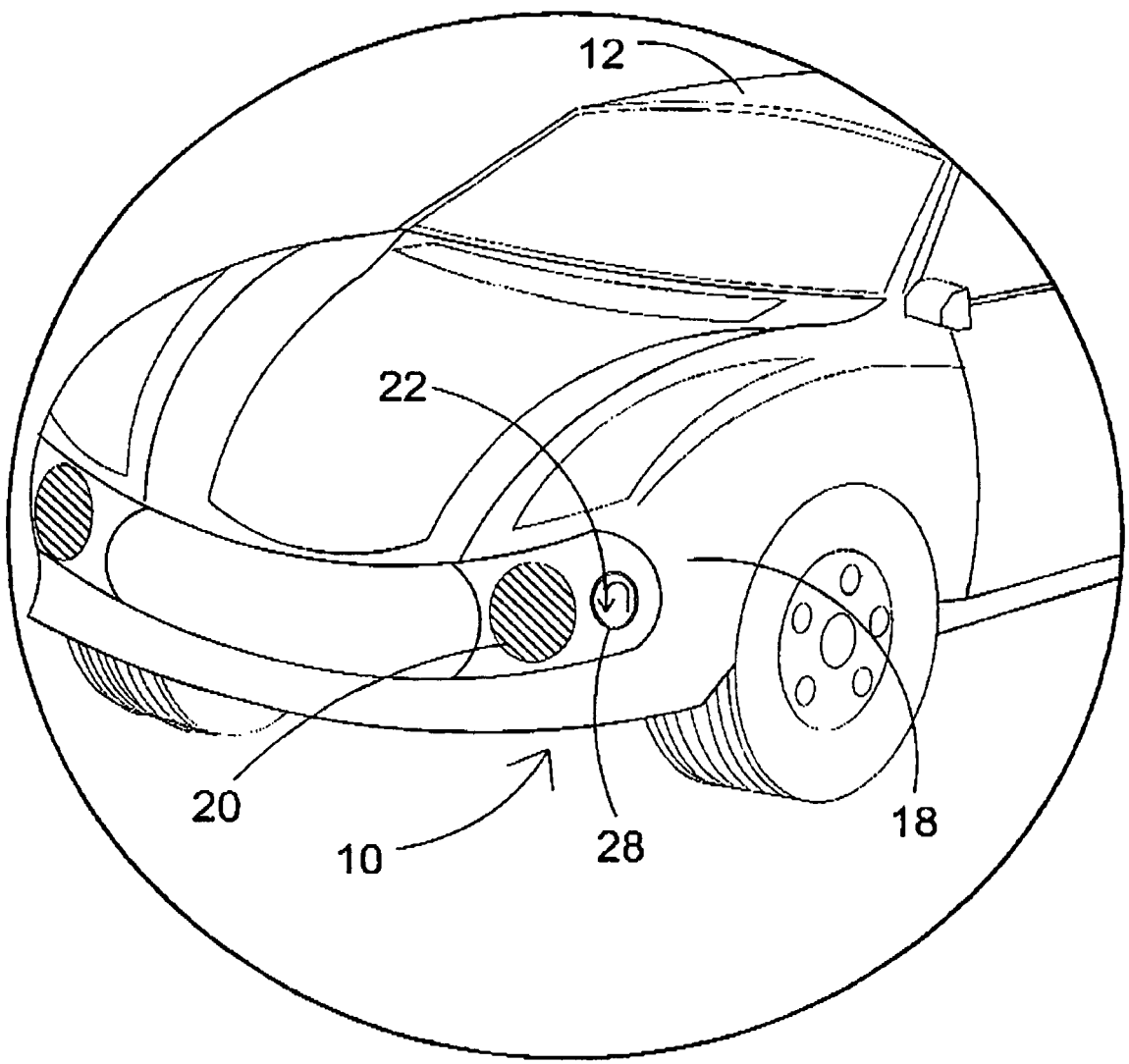
FIG. 3 is a front view of the present invention.

Turning to FIG. 3, shown therein is a front view of the present invention 10. Shown is the present invention 10 being a signal light 28 for vehicles having a U-turn symbol or indicia 22 incorporated on a signal light to inform other motorists of the vehicle's 12 intent. The U-turn light 28 is located on the left side 18 front and rear of the vehicle 12 in conjunction with turn signal lights and headlights 20. An activation switch is provided on the dashboard of the vehicle 12 and is activated when the operator intends to make a vehicular U-turn.

Figure 4:
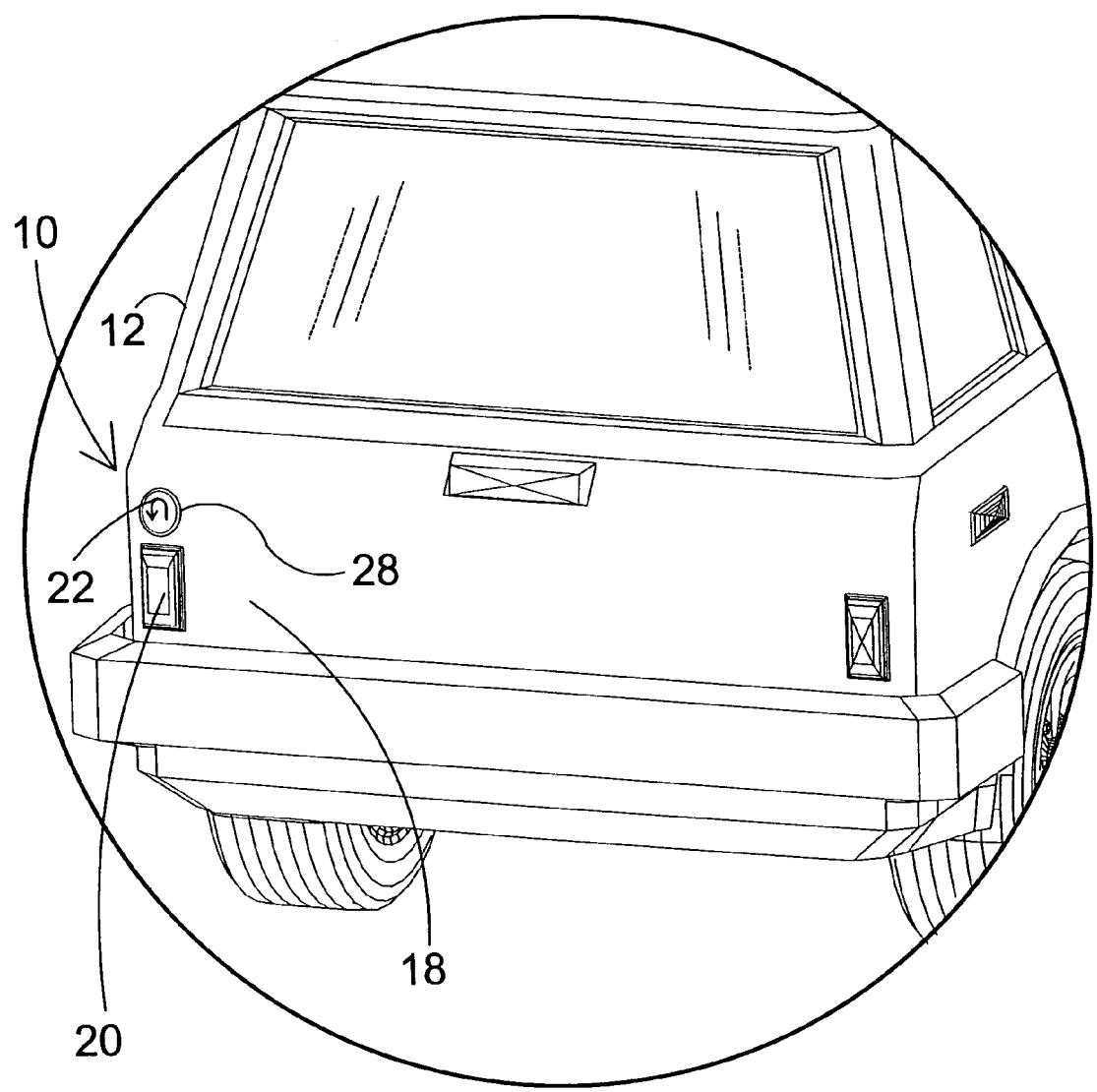
FIG. 4 is a rear view of the present invention.

Turning to FIG. 4, shown therein is a rear view of the present invention 10. Shown is the present invention 10 being a signal light 28 for vehicles 12 having a U-turn symbol 22 incorporated on a signal light to 28 inform other motorists of the vehicles intent. The U-turn light 10 is located on the left side 18 front and rear of the vehicle in conjunction with turn signal lights 20 and headlights. An activation switch is provided on the dashboard of the vehicle 12 and is activated when the operator intends to make a vehicular U-turn.

Figure 5:
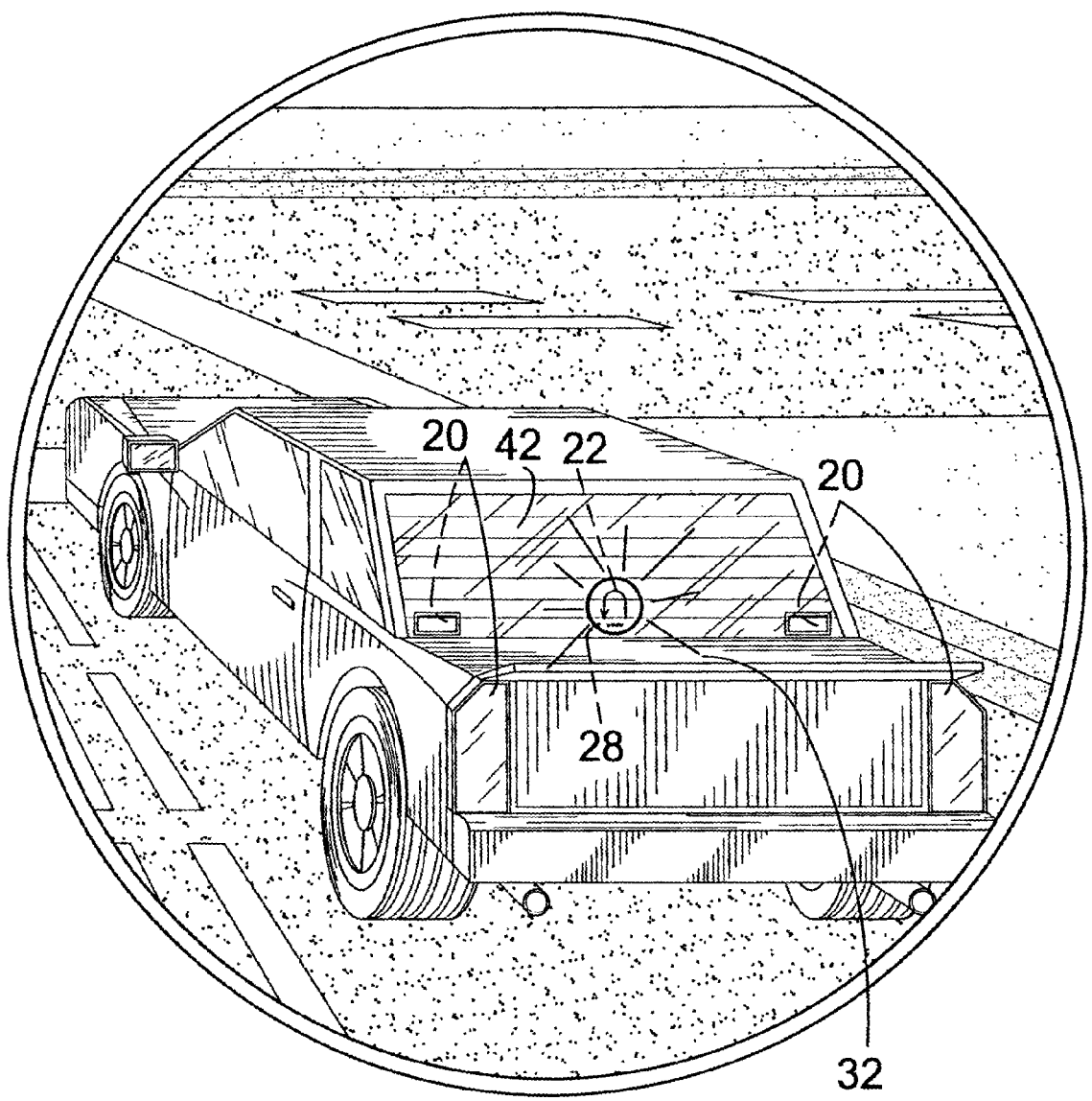
FIG. 5 is a rear view of the present invention.

Turning to FIG. 5, shown therein is a rear view of the present invention 10. Shown is the present invention 10 being a signal light 28 for vehicles 12 having a U-turn symbol 22 incorporated on a signal light to 28 inform other motorists of the vehicles intent. The U-turn light 10 is located in the interior of the vehicle proximate the rear windshield 42 being visible from the rear of the vehicle 32. Preferably centrally positioned between signal lights 20. An activation switch is provided on the dashboard of the vehicle 12 and is activated when the operator intends to make a vehicular U-turn.

Figure 6:
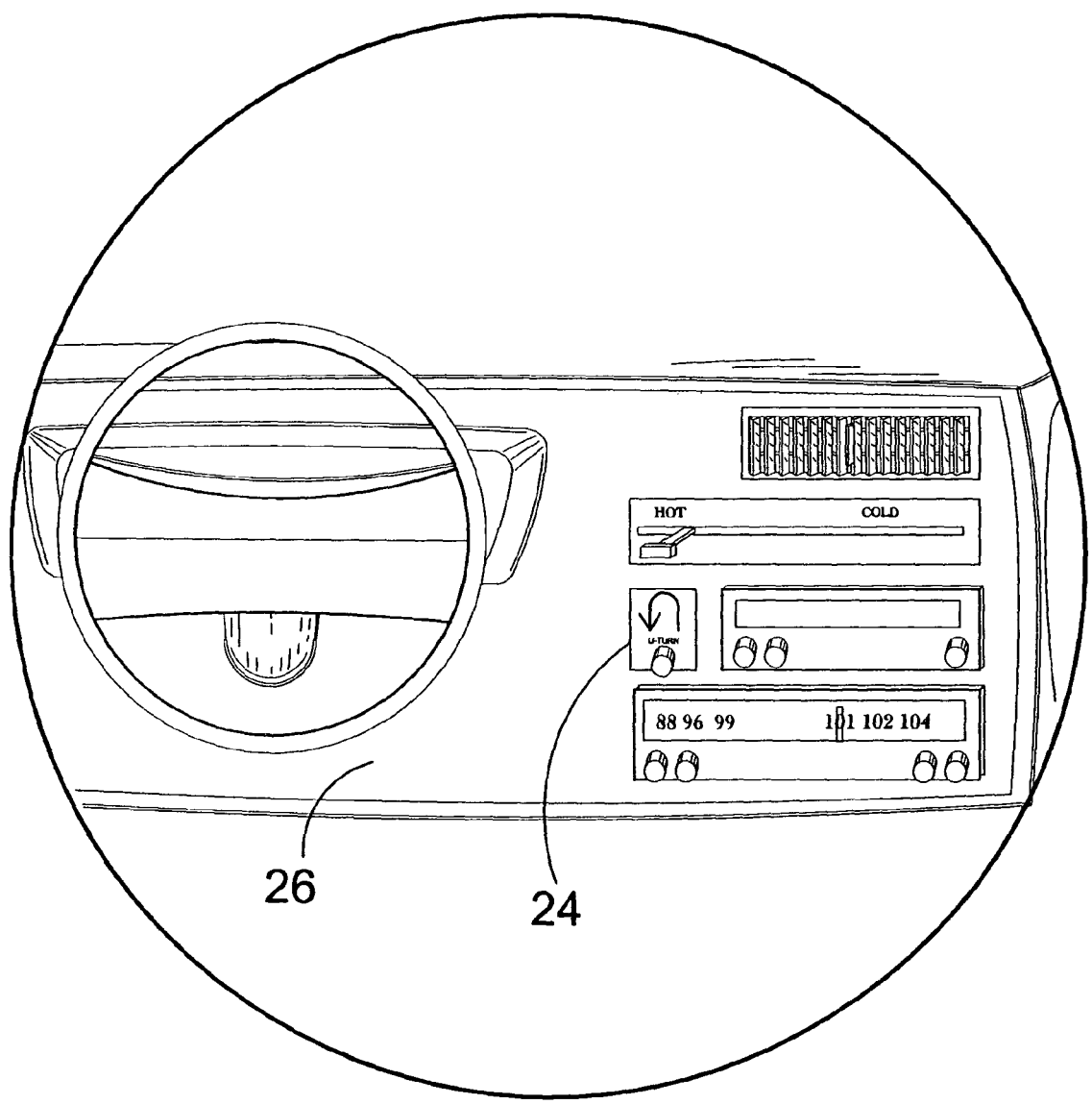
FIG. 6 is a dash board view of the switch of the present invention.

Turning to FIG. 6, shown therein is a dashboard view of the activation switch 24 of the present invention. Shown is a dashboard 26 having the activation switch 24 of the present invention disposed therein. The activation switch 24 can be located on the dashboard 26 or on a turn signal lever in conjunction with other indicator lights. The switch 24 is activated when the operator intends to perform a U-turn. The signal will inform other vehicles of the operator's intent. The signal lights are located on the front and rear left side of the vehicle.

Figure 7:
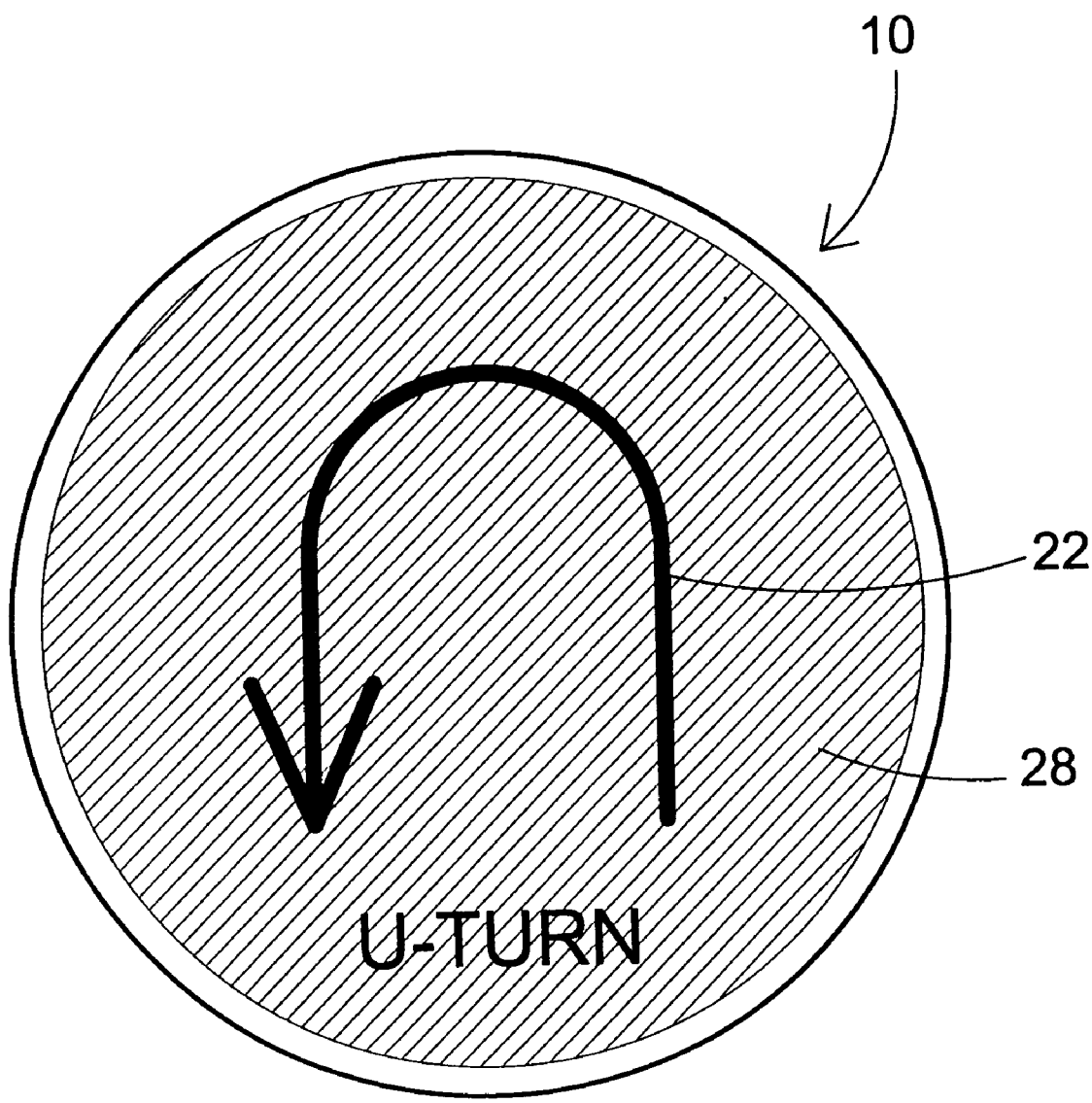
FIG. 7 is a front view of the signal light of the present invention.

Turning to FIG. 7, shown therein is a front view of the signal light 28 of the present invention 10. Shown is a front view of the signal light of the present invention 10. A switch, located within the vehicle is activated when the operator intends on performing a U-turn. The signal 28 will inform other vehicles of the operator's intent. The signal lights 28 are located on the front and rear left side of the vehicle. The signal light 28 comprises a U-turn symbol 22 and ambient light source visible during day light and night hours.

Figure 8:
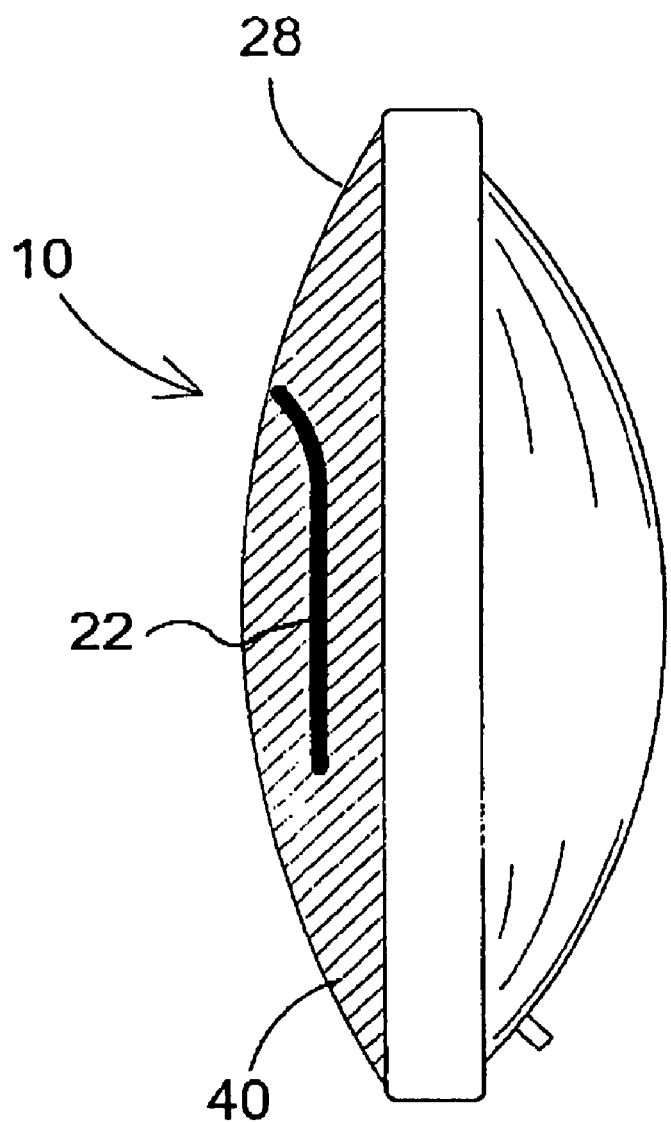
FIG. 8 is a side view of the signal light of the present invention.

Turning to FIG. 8, shown therein is a side view of the signal light 28 of the present invention 10. Shown is a side view of the signal light 28 of the present invention 10. A switch, located within the vehicle is activated when the operator intends on performing a U-turn. The signal 28 will inform other vehicles of the operator's intent. The signal lights are located on the front and rear left side of the vehicle. The signal light 28 comprises a U-turn symbol 22 disposed on the lens 40 thereof and ambient light source visible during day light and night hours.

Figure 9:
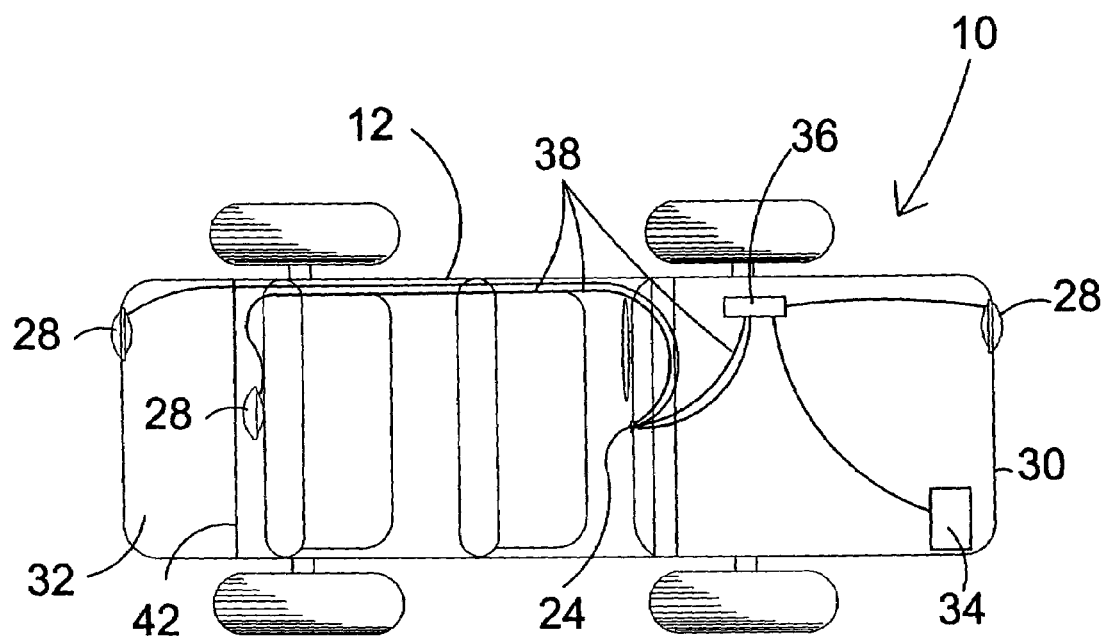
FIG. 9 is a top view of a vehicle having the signal light of the present invention.

Turning to FIG. 9, shown therein is a top view of a vehicle 12 having the signal light 28 of the present invention 10. Shown is a top view of a vehicle 12 having the signal light 28 of the present invention mounted therein. A switch 24 located within the vehicle 12 is activated when the operator intends on performing a U-turn. The signal 28 will inform other vehicles of the operator's intent. The signal lights 28 are located on the front 30 and rear 32 of the left side of the vehicle 12 and/or rear windshield 42 of the vehicle. The signal light 28 comprises a U-turn symbol and ambient light source visible during day light and night hours. Also shown are the vehicle battery 34 power source, junction box 36 and wiring 38.

Figure 10:
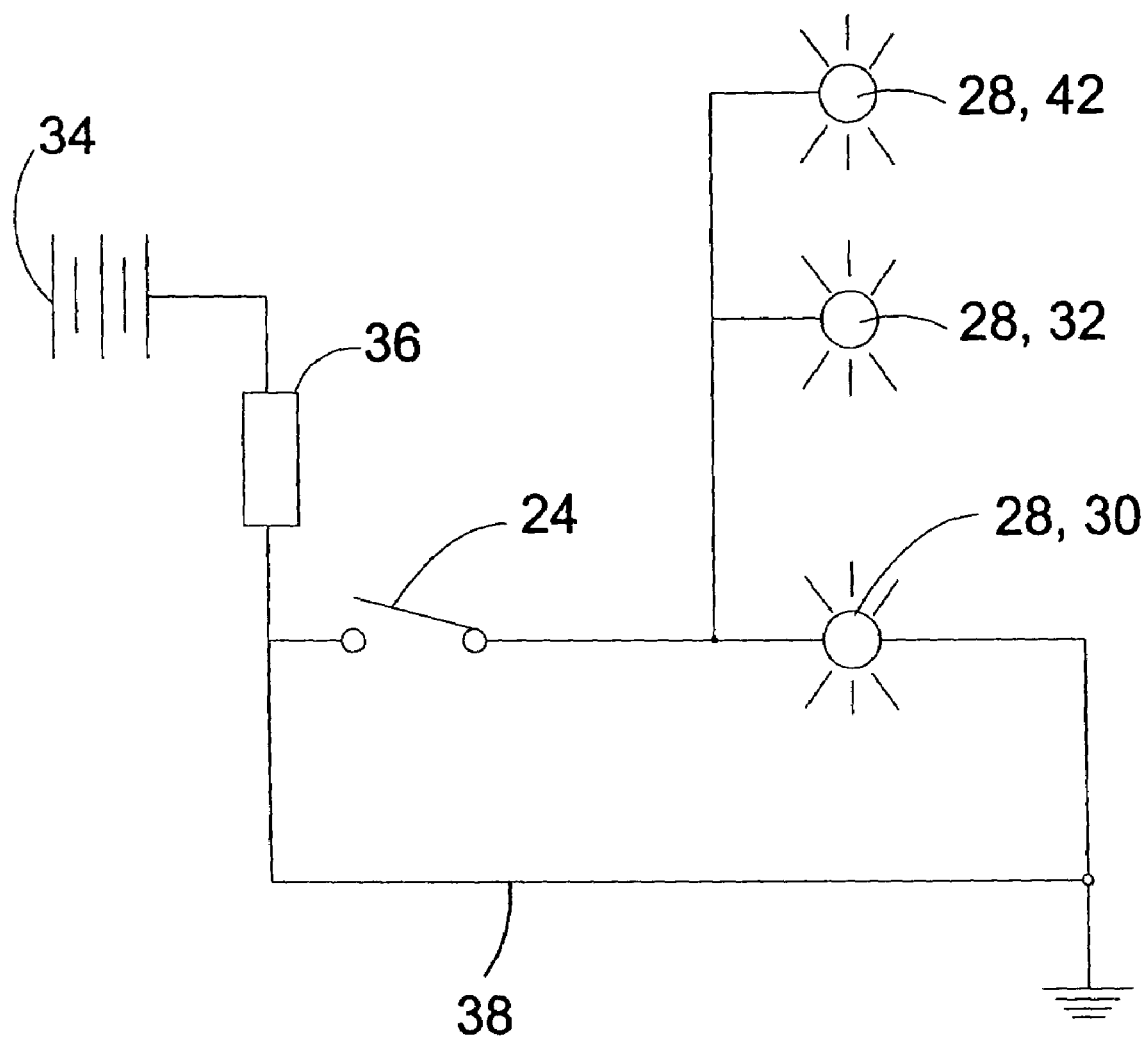
FIG. 10 is a schematic view of the electrical circuit of present invention.

Turning to FIG. 10, shown therein is a schematic view of the electrical circuit of present invention. Shown is a schematic diagram of the electrical circuit for the front 28, 30 and rear 28, 32 U-turn indicator apparatus of the present invention. As noted above, the conductor wire 38 extends outward from the battery 34 to contact and then connect to the front 28, 30 and rear 28, 32 vehicle indicators. The actuation of the U-turn switch 24 will result in energizing the U-turn vehicle indicators. A junction box 36 is also shown.

What is claimed to be new and desired to be protected by Letters Patent is set forth in the appended claims.

I claim:

1. A U-turn indicator for a motor vehicle, comprising:
a) a motor vehicle having front and rear opposing ends, a left driver's side and a right side, said motor vehicle having headlights and turn signal lights disposed thereon, wherein said headlights are disposed on said left and right sides of said front end, whereas said turn signal lights are disposed on said left and right sides of said front end and said rear end, said vehicle having a dashboard disposed therein;
b) U-turn signal lights disposed on said left side of said front end to the left of turn signals and said rear end of said vehicle adjacent to and above a left turn signal and inside of said vehicle centrally located behind a rear windshield, said U-turn signal lights having a lens thereon;
c) a U-turn symbol disposed on each lens of said U-turn signal lights with the phrase U-TURN in block letters under said symbol in said signal light located behind said rear windshield to permit an operator to signal to other vehicles that the operator is going to make a U-turn;
d) an activation switch for said U-turn signal lights being disposed on said dashboard to the right of a steering wheel to permit the U-turn signal lights to be controlled comprising a knob with a U-turn symbol above said knob; and, e) means for supplying power to said U-turn signal lights and said activation switch whereby the U-turn signal lights can be operated.

2. The U-turn indicator of claim 1, wherein said means for supplying power to said U-turn signal lights and said activation switch comprises:
   a) a battery to permit the motor vehicle U-turn signal lights and activation switch to be powered;
   b) a junction box electrically connected to said battery; and
   c) an electric wire from said junction box to the front U-turn signal light, and electrical wires from said activation switch to said junction box and to the rear U-turn signal lights.

3. A U-turn indicator for a motor vehicle, comprising:
   a) a motor vehicle having front and rear opposing ends, a left driver's side and a right side, said motor vehicle having headlights and turn signal lights disposed thereon, wherein said headlights are disposed on said left and right sides of said front end, whereas said turn signal lights are disposed on said left and right sides of said front end and said rear end, said vehicle having a front and rear windshield and dashboard disposed therein;
   b) a U-turn signal light disposed within said vehicle positioned within said vehicle centrally and proximate said rear windshield, said U-turn signal light having a lens thereon;
   c) a U-turn symbol disposed on said lens of said U-turn signal light with the phrase U-TURN in block letters under said symbol to permit an operator to signal to other vehicles that the operator is going to make a U-turn;
   d) an activation switch for said U-turn signal light being disposed on a turn signal lever to permit the U-turn signal light to be controlled; and,
   e) means for supplying power to said U-turn signal light and said activation switch whereby the U-turn signal light can be operated.

4. The U-turn indicator of claim 3 having additional U-turn signal lights disposed on said left side of said front end to the left of turn signals and said rear end of said vehicle adjacent to and above a left turn signal.

* * * * *